US008374407B2

(12) United States Patent
Benkley et al.

(10) Patent No.: US 8,374,407 B2
(45) Date of Patent: Feb. 12, 2013

(54) LIVE FINGER DETECTION (75) Inventors: Fred George Benkley, Andover, MA (US); David Joseph Geoffroy, Amherst, MA (US)

(73) Assignee: Validity Sensors, Inc., San Jose, CA (US)

( * ) Notice: Subject to any disclaimer, the term of this patent is extended or adjusted under 35 U.S.C. 154(b) by 933 days.

(21) Appl. No.: 12/361,408

(22) Filed: Jan. 28, 2009

(65) Prior Publication Data

US 2010/0189314 A1 Jul. 29, 2010

(51) Int. Cl.
*G06K 9/00* (2006.01)

(52) U.S. Cl. ...................................................... 382/124

(58) Field of Classification Search .......... 382/115–118, 382/124–127
See application file for complete search history.

(56) References Cited

U.S. PATENT DOCUMENTS

| | | |
|---|---|---|
| 4,151,512 A | 4/1979 | Riganati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Lofberg |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hsu et al. |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,456,256 A | 10/1995 | Schneider et al. |
| 5,543,591 A | 8/1996 | Gillespie et al. |
| 5,569,901 A | 10/1996 | Bridgelall et al. |

(Continued)

FOREIGN PATENT DOCUMENTS

| | | |
|---|---|---|
| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.
Maltoni, "Handbook of Fingerprint Recognition", XP002355942 Springer, New York, USA, Jun. 2003 pp. 65-69.
Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

(Continued)

*Primary Examiner* — Alex Liew
(74) *Attorney, Agent, or Firm* — Greenberg Traurig LLP; Cecily Anne O'Regan; William C. Cray (57) ABSTRACT

A live finger detection system and method includes a drive plate configured to inject radio frequency signals into an object proximate the drive plate. The injected radio frequency energy causes the object to radiate an electric field. A pickup plate is configured to detect an intensity associated with the electric field radiated by the object. A sensor coupled to the pickup plate is configured to determine whether the object is a live finger based on the detected intensity of the electric field radiated by the object.

29 Claims, 7 Drawing Sheets

U.S. PATENT DOCUMENTS

| | | | |
|---|---|---|---|
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Hara et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A * | 10/1999 | Setlak ........................ 382/312 |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,332,193 B1 | 12/2001 | Glass et al. |
| 6,333,989 B1 | 12/2001 | Borza |
| 6,337,919 B1 | 1/2002 | Duton |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLean |
| 7,379,569 B2 | 5/2008 | Chikazawa et al. |
| 7,408,135 B2 | 8/2008 | Fujieda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,107,212 B2 | 1/2012 | Nelson et al. |

| | | |
|---|---|---|
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1* | 5/2003 | Su et al. .................. 382/124 |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1* | 1/2004 | Kocher .................. 382/125 |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1* | 12/2004 | Lan et al. ................. 382/124 |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1* | 6/2005 | Boshra .................. 382/124 |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267385 A1 | 11/2006 | Steenwyk et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |

| | | | |
|---|---|---|---|
| 2008/0267462 A1 | 10/2008 | Nelson et al. | |
| 2008/0279373 A1 | 11/2008 | Erhart et al. | |
| 2008/0317290 A1 | 12/2008 | Tazoe | |
| 2009/0130369 A1 | 5/2009 | Huang et al. | |
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0119124 A1 | 5/2010 | Satyan | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Thompson et al. | |
| 2010/0180136 A1 | 7/2010 | Thompson et al. | |
| 2010/0208953 A1 | 8/2010 | Gardner et al. | |
| 2010/0244166 A1 | 9/2010 | Shibuta et al. | |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0090047 A1 | 4/2011 | Patel | |
| 2011/0102567 A1 | 5/2011 | Erhart | |
| 2011/0102569 A1 | 5/2011 | Erhart | |
| 2011/0175703 A1 | 7/2011 | Benkley | |
| 2011/0176307 A1 | 7/2011 | Benkley | |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |
| 2012/0044639 A1 | 2/2012 | Garcia | |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| EP | 2343677 A1 | 7/2011 |
| EP | 2343679 A1 | 7/2011 |
| GB | 2331613 A | 5/1999 |
| GB | 2480919 | 12/2011 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/0104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 | 5/2011 |

OTHER PUBLICATIONS

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Gassend, et al., "Controlled Physical Random Functions", In Proceedings of the 18th Annual Computer Security Conference, Las Vegas, Nevada, Dec. 12, 2002.

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

BELLAGIODESIGNS.COM (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

LIVE FINGER DETECTION

BACKGROUND

The invention relates generally to systems and methods for determining whether a live human finger is being applied to a fingerprint sensor or other sensing device. In particular, the described systems and methods prevent unauthorized users from "spoofing" a fingerprint sensor by creating artificial fingers that replicate the fingerprint pattern of a valid user.

Fingerprint sensors are seeing increased usage in many devices, such as laptop computers, cell phones and other mobile devices, and security systems for the purpose of user authentication and password replacement. This increased usage of fingerprint sensors has raised concerns about the level of security provided by these sensors. One concern involves the creation of artificial fingers that replicate the fingerprint pattern of a valid user and are applied to the fingerprint sensor to gain unauthorized access to a device, building, and the like. These artificial fingers are often created using materials that are electrically and optically similar to live finger tissue. Materials commonly used to create artificial fingers include gelatins, rubbers, and glues.

Several techniques have been developed in an attempt to detect the electrical differences between live human fingers and artificial fingers created for the purpose of "spoofing" a fingerprint sensor. Most of these techniques try to differentiate live fingers from artificial fingers by attempting to detect small differences in internal electrical impedance values that are measured by electrically contacting the finger. For example, existing techniques measure the capacitance of an object and determine whether the object's capacitance is within a range associated with the biological characteristics of live finger tissue. Other similar techniques measure the resistance or electrical impedance of an object instead of the object's capacitance.

These existing techniques are used with limited success due to the wide variations in capacitance, resistance, and impedance of human tissue over large populations and demographics. These wide variations prevent the establishment of accurate boundaries for detecting live fingers without increasing the false rejection rate of the detection system. Additionally, the capacitance, resistance, and impedance of human tissue varies over time for a particular user and changes in response to environmental conditions. For example, the resistance of a user's finger changes in proportion to sweat gland activity in the user's finger. Additionally, dermatological conditions, diet, and exposure to certain chemicals can alter the capacitance, resistance, and impedance of human tissue.

BRIEF DESCRIPTION OF THE DRAWINGS

Throughout the description, similar reference numbers may be used to identify similar elements.

DETAILED DESCRIPTION

The systems and methods described herein perform live finger detection using radiated RF (radio frequency) electric field patterns. The described systems and methods detect differences in the externally radiated electric field patterns created by live human fingers excited with RF energy as compared to artificial fingers. This approach more reliably detects live human fingers than the previous systems discussed. The systems and methods described herein are more reliable due to the relatively stable electric field patterns generated by live human fingers across a wide spectrum of population and demographics.

When describing the live finger detection systems and methods herein, the object being detected is often referred to as a "finger". However, any reference to a "finger" herein includes both a live human finger as well as an artificial finger or any other object being presented for verification or other purposes. Although the described systems and methods refer to live finger detection, these systems and methods may be adapted to detect and/or validate other types of objects.

Figure 1:
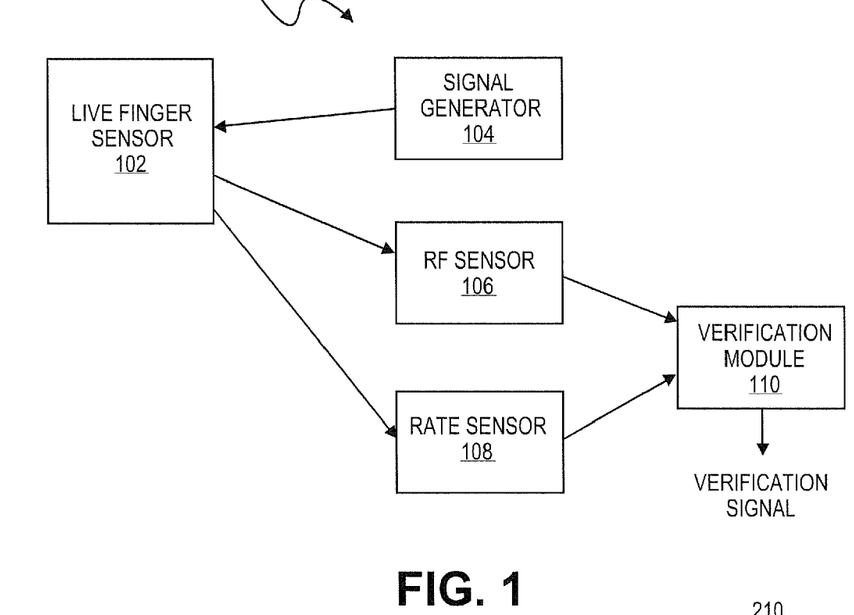
FIG. 1 depicts a block diagram of an embodiment of a live finger detection system.

FIG. 1 depicts a block diagram of an embodiment of a live finger detection system 100. Live finger detection system 100 includes a live finger sensor 102 on which a user places their finger as part of the live finger detection process. Live finger sensor 102 is coupled to receive signals from a signal generator 104. Signal generator 104 generates signals used by live finger sensor 102 to inject RF electric fields into a finger placed on the live finger sensor. An RF sensor 106 receives signals from live finger sensor 102 indicating the strength of the RF fields detected near the finger by a detection portion of the live finger sensor 102, as discussed in greater detail below.

In particular embodiments of live finger detection system 100, a rate sensor 108 receives signals from live finger sensor 102. Rate sensor 108 processes the received signals to determine a speed with which a finger or other object is swiped across live finger sensor 102. A verification module 110 receives signals from RF sensor 106 and, optionally, from rate sensor 108. Verification module 110 uses those received signals along with knowledge of RF fields radiated by live human fingers to determine whether the object applied to live finger sensor 102 is a live human finger or an artificial finger. Verification module 110 then generates a verification signal indicating whether or not the object applied to live finger sensor 102 is verified as a live human finger.

Figure 2:
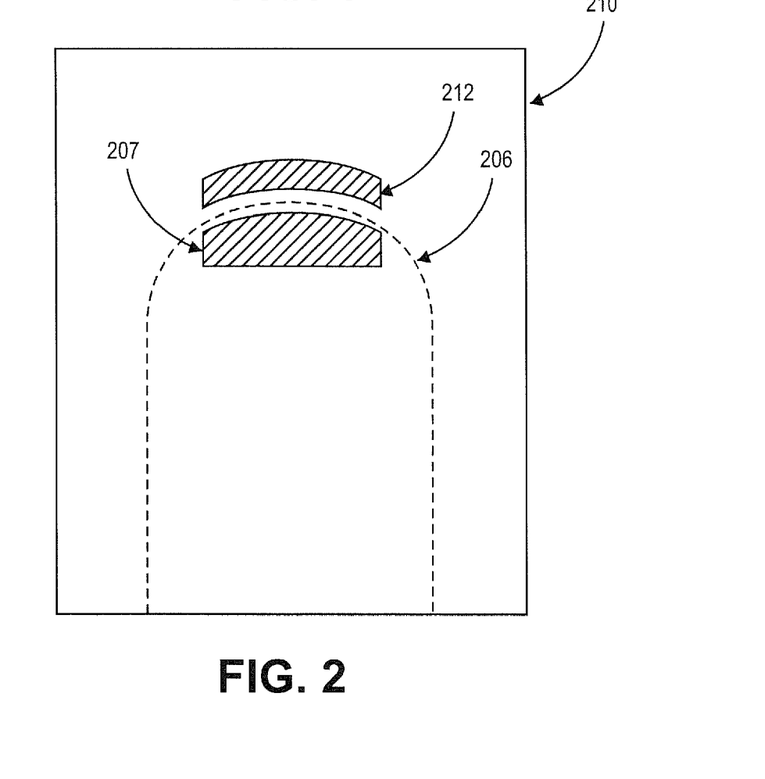
FIG. 2 depicts an embodiment of a live finger sensor.

FIG. 2 depicts an embodiment of live finger sensor 102. Live finger sensor 102 and its components can be of any size that accommodates a human finger or other object being sensed. Live finger sensor 102 includes a single drive plate 207 positioned within a drive plate area 206 and a pickup plate 212 located on a substrate 210. Drive plate area 206 identifies the approximate perimeter of the area that the finger contacts the live finger sensor. Drive plate 207 is a conductive plate disposed on substrate 210 and coupled to drive an electrical signal from a signal generator 104 into the body of the finger. In alternate embodiments, live finger sensor 102 includes an array of multiple drive plates positioned within drive plate area 206.

In response to the live finger sensor detecting an object placed upon it, drive plate 207 injects RF energy into that object (e.g., a live human finger or an artificial finger) contacting the drive plate. This RF energy causes electric RF fields to radiate outwardly from the surface of the object. As discussed below, the characteristics of the electric RF fields radiated from the object vary depending on whether the object is a live human finger, an artificial finger, or another type of object. Thus, a live human finger is detected by analyzing the characteristics of the electric RF fields radiated from the object. Although particular examples of drive plate 207 are illustrated and discussed herein, alternate embodiments may utilize any radio frequency energy source or other device capable of injecting RF energy into an object. In a particular embodiment, drive plate 207 is constructed from materials that are electrically more conductive than a finger, such as copper traces formed on a printed circuit board.

Pickup plate 212 is a conductive plate disposed on substrate 210. Pickup plate 212 detects the electric RF fields radiated from the object and is coupled to communicate information about the detected electric RF fields to RF sensor 106 (FIG. 1). In a particular embodiment, pickup plate 212 detects the intensity or amplitude of the electric RF fields proximate the pickup plate. Pickup plate 212 is typically positioned close to drive plate 207, but electrically insulated from the drive plate. Additionally, pickup plate 212 is generally positioned such that the pickup plate does not contact the object radiating the electric RF fields. Although particular examples of pickup plate 212 are illustrated and discussed herein, alternate embodiments may utilize any device or component capable of detecting the intensity, amplitude, or other characteristics of the electric RF fields radiated from the object. In a particular embodiment, finger tip 204 is aligned with the edge of pickup plate 207 and is less than 1 mm from pickup plate 211.

In the embodiment of FIG. 2, one side of drive plate 207 is formed with a contoured arc that generally corresponds to the curvature of a human finger tip. Similarly, pickup plate 212 is formed with a contoured arc that generally corresponds to the contoured arc formed in drive plate 207. Thus, pickup plate 212 is generally spaced an equal distance from a finger tip along the length of the pickup plate. In alternate embodiments, drive plate 207 and/or pickup plate 212 are rectilinear plates extending substantially parallel to the tip of a human finger.

The components shown in FIG. 2 are not necessarily drawn to scale. The ratio of the dimensions of drive plate 207 to the dimensions of pickup plate 212 may vary from the illustration in FIG. 2. In alternate embodiments, the size, shape, and positioning of drive plate 207 and pickup plate 212 may vary from the embodiment of FIG. 2. In a particular embodiment, pickup plate 212 is formed using a conductive material such as copper.

Substrate 210 provides a mounting and/or support mechanism for drive plate 207, pickup plate 212, and any number of other components and/or devices. Substrate 210 can be a rigid material or it can be flexible, depending on the particular application. Additionally, substrate 210 can be any thickness (and may have varying thickness) and can be manufactured from any material or combination of materials. In one embodiment, substrate 210 also includes a fingerprint sensor disposed thereon or otherwise contained within substrate 210. This embodiment is discussed in greater detail below. In particular embodiments, substrate 210 is formed using fiberglass filled epoxy for rigid substrates or formed using Kapton® polyimide film (available from DuPont) for flexible substrates.

In one embodiment of a live finger detection system, signal generator 104 applies a signal to drive plate 207 that is approximately 2.5 volts. This signal is also referred to as a "drive signal". The spacing between drive plate 207 and pickup plate 212 varies based on the magnitude of the signal applied to the drive plate. In the example of a 2.5 volt signal applied to drive plate 207, the spacing between the drive plate and pickup plate 212 is less than one millimeter. In embodiments that apply a signal to drive plate 207 that is greater than 2.5 volts, a larger spacing between the drive plate and pickup plate 212 is possible.

A particular embodiment of live finger sensor 102 receives a signal from signal generator 104 that has a frequency in the range of 10-30 MHz. This signal is applied to drive plate 207. The signal from signal generator 104 may be received in bursts or in a continuous or pseudo-continuous manner. Higher frequency signals generally cause more electric RF fields to be radiated from the finger, thereby providing more RF fields for detection by pickup plate 212 and validation by verification module 110. In alternate embodiments, multi-frequency signals are provided from signal generator 104 to drive plate 207. For example, a multi-frequency signal can include two or more frequencies that are separated by at least one decade of frequency. Multiple-frequency signals generally provide more information, and thereby provide better discrimination between live human fingers and artificial fingers.

In one embodiment, pickup plate 212 detects the intensity or amplitude of the electric RF fields proximate the pickup plate. In other embodiments, one or more pickup plates (and related sensors) measure the phase of the electric RF fields proximate the pickup plate(s) as well as the amplitude of the electric RF fields. The addition of a phase measurement can enhance the ability of the system to distinguish between a live human finger and an artificial finger.

Figure 3:
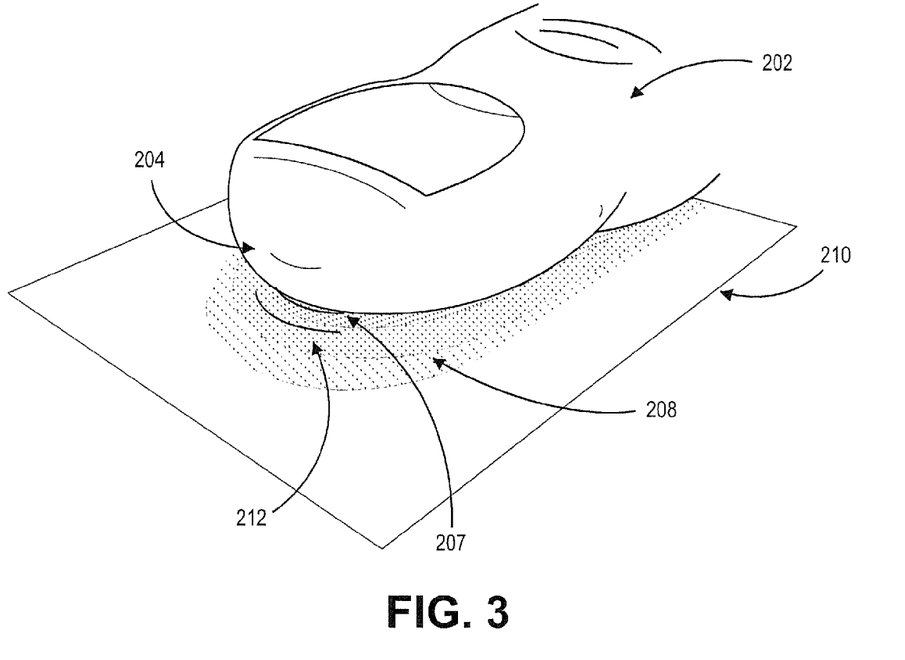
FIG. 3 depicts a finger being applied to an embodiment of a live finger sensor.

FIG. 3 depicts finger 202 being applied to an embodiment of a live finger sensor. Finger 202 includes a finger tip 204 and is positioned on substrate 210 such that the finger substantially covers drive plate 207. Thus, when signal generator 104 applies a drive signal to drive plate 207, various electric RF fields 208 radiate outwardly from the surface of finger 202. Electric RF fields 208 are shown in FIG. 3 as gradients that decrease in intensity as they radiate away from the surface of finger 202. Although FIG. 3 shows electric RF fields 208 radiating outwardly from the plane of substrate 210, finger 202 radiates electric RF fields outwardly from the finger in all three dimensions around the body of the finger. Pickup plate 212 senses the intensity of electric RF fields 208 and provides the sensed intensity to RF sensor 106 (FIG. 1). In a particular embodiment of the live finger sensor shown in FIG. 3, finger tip 204 is aligned with the edge of pickup plate 207 and is less then 1 mm from pickup plate 211.

Figure 4:
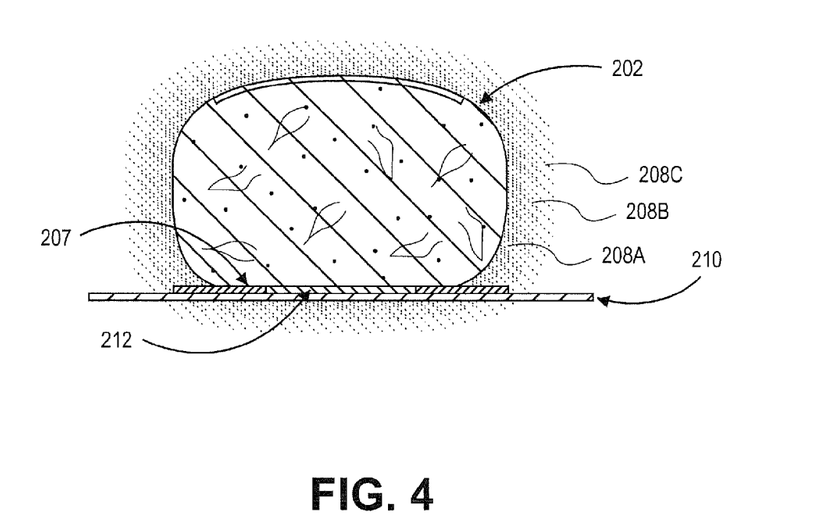
FIG. 4 depicts a cross-sectional view of a finger being applied to an embodiment of a live finger sensor.

FIG. 4 depicts a cross-sectional view of finger 202 being applied to an embodiment of a live finger sensor. As discussed above, the live finger sensor includes substrate 210 with drive plate 207 and pickup plate 212 disposed on the substrate. When signal generator 104 applies a drive signal to drive plate 207, electric RF fields 208 radiate outwardly from the surface of finger 202. Electric RF fields decrease in intensity as they radiate farther away from the surface of finger 202. As illustrated in FIG. 4, electric RF field 208 has the greatest intensity closest to the surface of finger 202, as indicated by reference numeral 208A. As the electric RF field radiates farther away from finger 202, the intensity decreases, as indicated by reference numeral 208B. The electric RF field continues radiating farther from finger 202 and further decreasing in intensity, as indicated by reference numeral 208C. As mentioned above with respect to FIG. 3, electric RF fields radiate outwardly from the surface of finger 202 in all three dimensions around the body of the finger. A two dimensional slice of the electric RF fields of 208A, 208B, and 208C are intercepted onto substrate 210 and picked up by plate 212.

Figure 5:
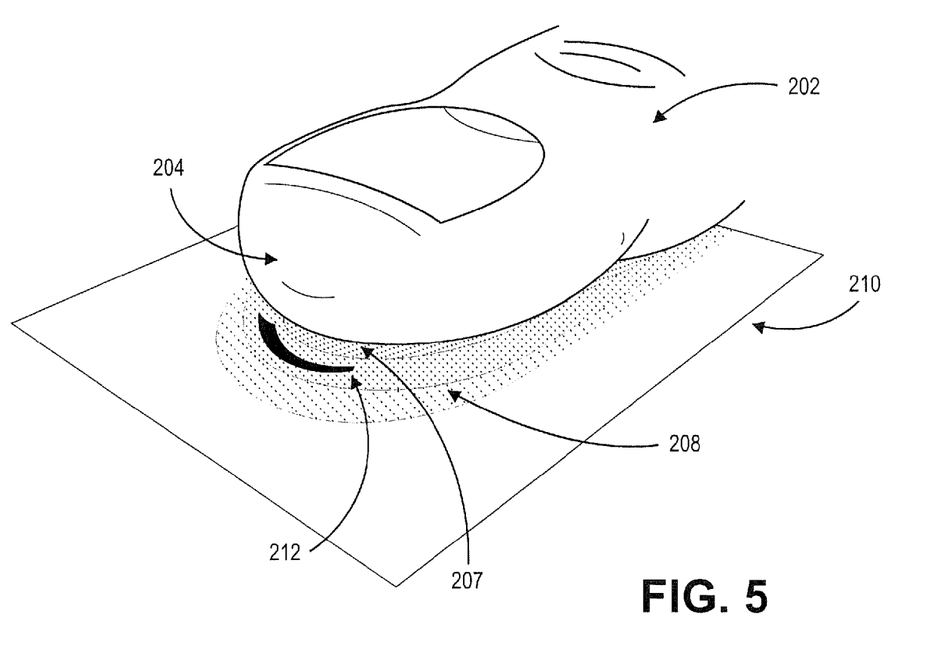
FIG. 5 depicts a finger being applied to another embodiment of a live finger sensor.

FIG. 5 depicts finger 202 being applied to another embodiment of a live finger sensor. In the embodiment of FIG. 5, pickup plate 212 extends partially perpendicular from substrate 210. Pickup plate 212 has a contoured arc shape that substantially follows the contour of finger tip 204 as the pickup plate extends upwardly (as oriented in FIG. 5) from substrate 210. This configuration typically includes a mechanism to support pickup plate 212, such as a plastic housing or other arrangement to support the extension of the pickup plate from substrate 210.

Figure 6:
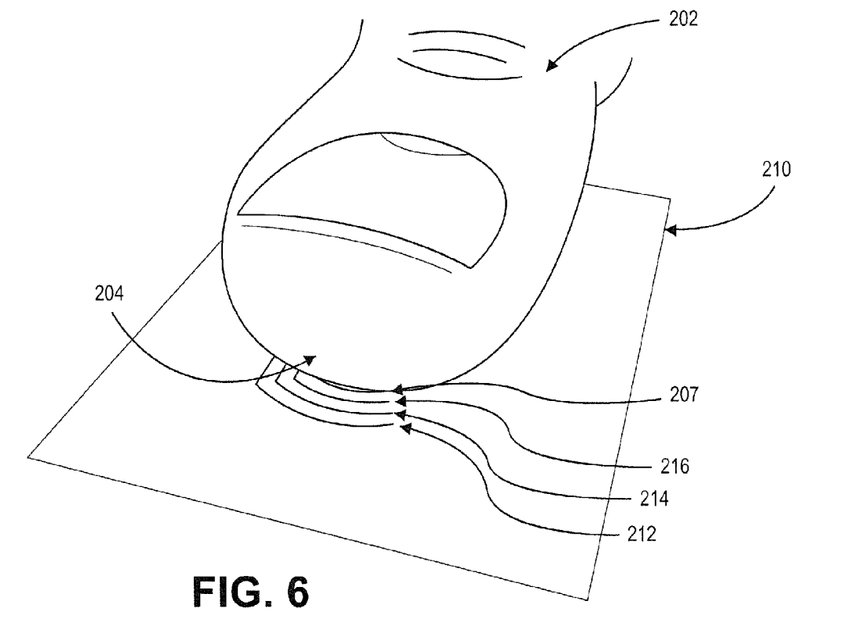
FIG. 6 depicts a finger being applied to yet another embodiment of a live finger sensor.

FIG. 6 depicts finger 202 being applied to yet another embodiment of a live finger sensor. The embodiment of FIG. 6 includes multiple pickup plates 212, 214, and 216 disposed adjacent to finger tip 204. This embodiment allows the live finger detection system to simultaneously measure the electric RF field at multiple known distances from finger 202. In operation, all three pickup plates 212, 214, and 216 are sensed simultaneously, thereby permitting the measurement of differences in the intensity of the electric RF field between the three pickup plates.

FIG. 6 is particularly useful with fingerprint sensors that rely on static finger placement to capture a full fingerprint image in a single frame. In these types of fingerprint sensors, multiple pickup plates are positioned outside the fingerprint sensing area to measure radiated RF fields. The multiple pickup plates are typically positioned around the perimeter of the finger placement area.

Figure 7:
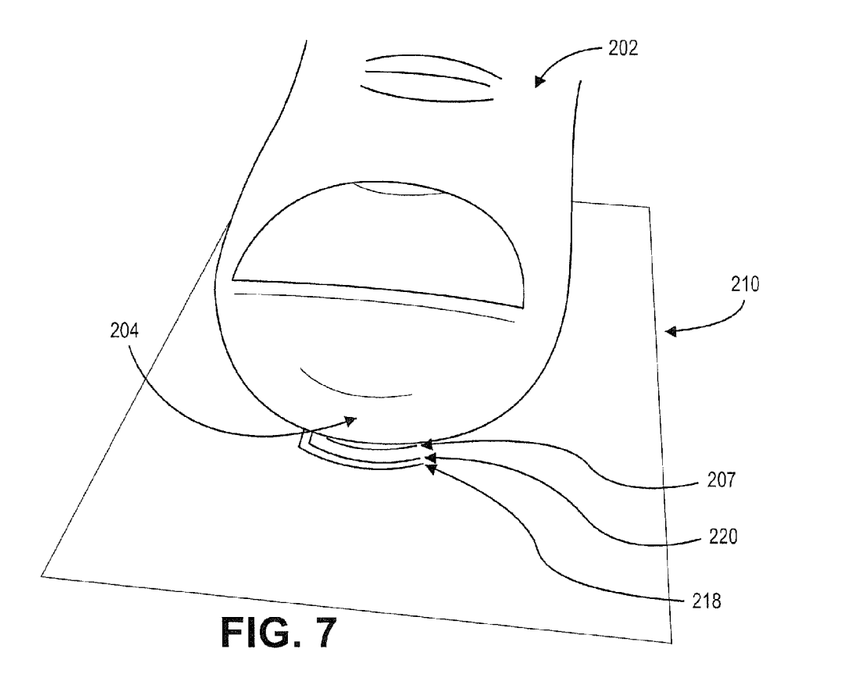
FIG. 7 depicts a finger being applied to a further embodiment of a live finger sensor.

FIG. 7 depicts finger 202 being applied to a further embodiment of a live finger sensor. The embodiment of FIG. 7 includes a pair of differential pickup plates 218 and 220 positioned adjacent to finger tip 204. Pickup plates 218 and 220 are configured to measure the electric RF fields radiated from finger 202. This configuration allows the live finger detection system to measure the difference in the electric RF field between pickup plates 218 and 220, and has the advantage of reducing common mode noise sources and far field noise sources. Typically, pickup plates 218 and 220 are placed in close proximity to one another to improve noise reduction. In a particular embodiment, pickup plates 218 and 220 are separated by approximately 50-100 micrometers. Pickup plates 218 and 220 are typically coupled to a differential receiver (not shown) that determines the difference in the electric RF field between the two pickup plates.

Figure 8A:
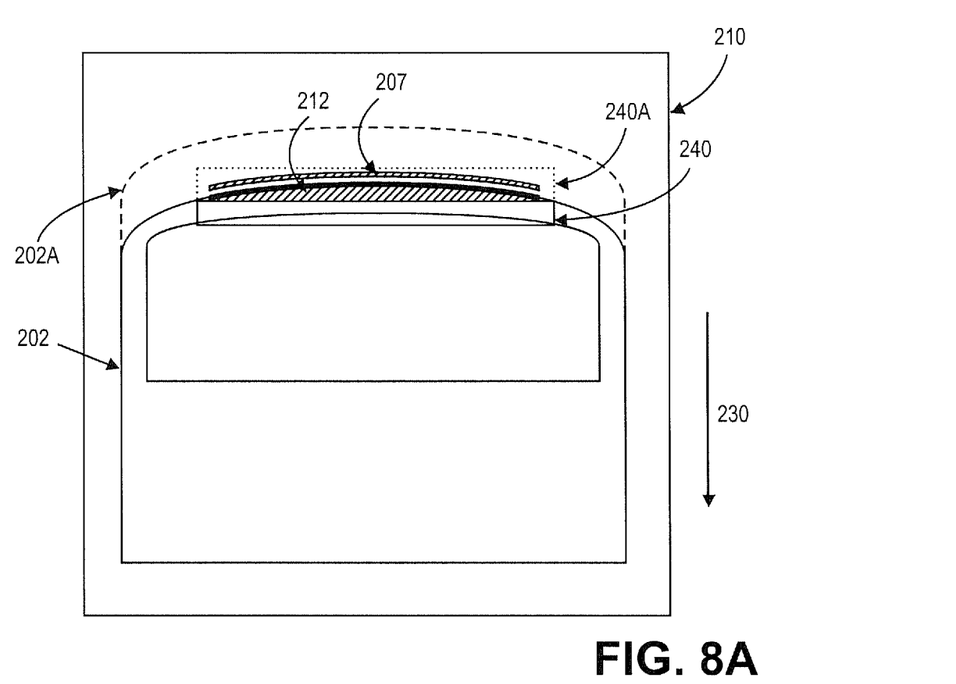
FIGS. 8A and 8B depict additional embodiments of a live finger sensor including a fingerprint sensor.
Figure 8B:
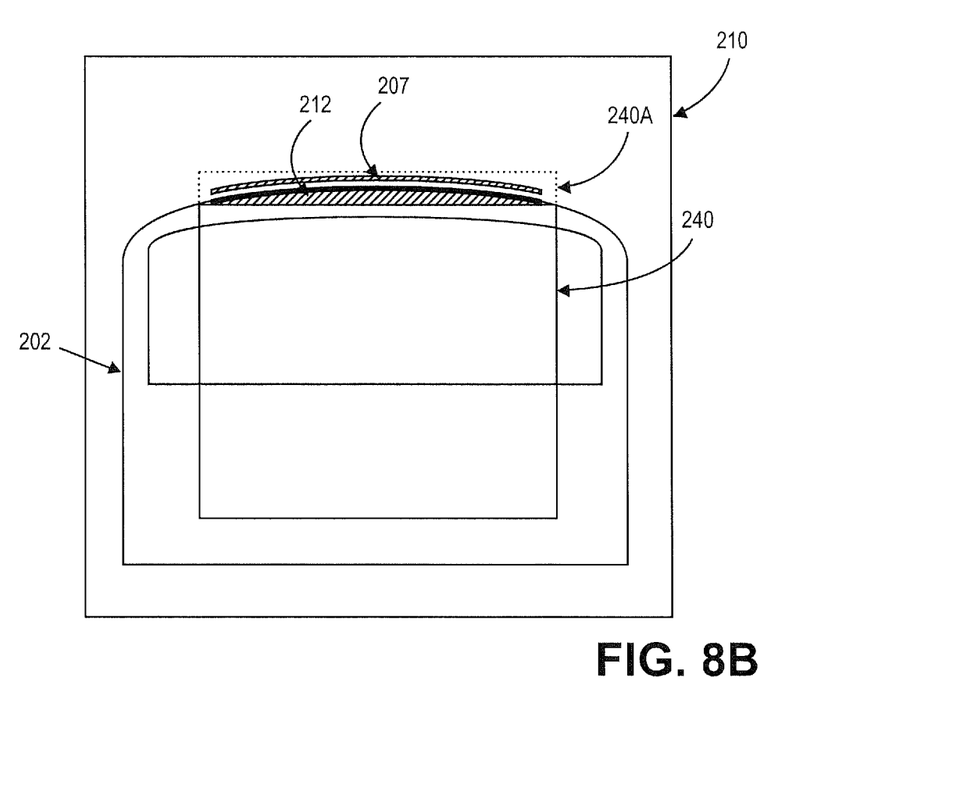

FIG. 8A and 8B depict additional embodiments of a live finger sensor that includes a fingerprint sensor 240. The embodiment of FIG. 8A includes drive plate 207 and pickup plate 212 disposed on substrate 210 in the manner discussed herein. Additionally, fingerprint sensor 240 is positioned on substrate 210. Fingerprint sensor 240 captures an image associated with a user's fingerprint. Fingerprint sensor 240 may be any type of fingerprint sensor, such as a swipe fingerprint sensor shown in FIG. 8A where a user's finger is swiped across the sensor from the position in 202A to 202 in the direction of arrow 230. A static fingerprint sensor (also referred to as a placement sensor) is shown in FIG. 8B where a full fingerprint image is captured in a single frame. Fingerprint sensor 240 can be used with any of the live finger sensor embodiments and alternate embodiments discussed herein. In one embodiment, pickup plate 207 and drive plate 212 are integrated onto the same substrate as fingerprint sensor 240 creating a larger multifunction sensor shown by the additional sensor area of 240a. In one implementation, fingerprint sensor 240 includes swiped imaging sensors consisting of two or more rows of imaging pixels. Such sensors calculate the speed of the finger passing over it by measuring the time it takes for unique fingerprint features to pass from one image line to the next. This information can also be used to normalize the speed of the finger tip as is passes from drive plate 207 to pickup plate 212.

As the finger is swiped in direction 230 from position 202A to 202 across the live finger sensor in FIG. 8A, the finger tip crosses drive plate 207, then crosses pickup plate 212, and eventually moves off the pickup plate. Electric RF field information is sampled by pickup plate 212 at a rate that is significantly faster than the rate at which the finger is swiped across the sensor. Based on the sampled RF field information, the live finger detection system creates a time-RF field intensity profile of the RF fields sensed (e.g., sampled) along the axis of the swipe. In a particular embodiment, the RF field samples are taken at intervals of approximately 100 microseconds to one millisecond, which is comparable to the sampling rate of many swipe fingerprint sensors. Additional details regarding evaluation of the RF field intensity profile are discussed below.

In an alternate embodiment of a live finger sensor, finger 202 is swiped across drive plate 207, but not swiped across pickup plate 212. In this alternate embodiment, pickup plate 212 is positioned in front of finger tip 204 and finger 202 is swiped away from the pickup plate as the finger is swiped across drive plate 207.

In another embodiment of a live finger sensor, two or more contact sensors are positioned along the axis of finger movement. This embodiment has the advantage of simultaneously capturing the entire electric RF field roll off profile outside the finger at the same time. In this embodiment, the array of pickup plates extends beyond the radiated field patterns projecting from the end of the finger.

Specific embodiments discussed herein include one or more pickup plates that detect the electric RF fields radiated from the tip of a finger or other object. As discussed herein, the electric RF fields radiated from the finger radiate outwardly in all directions from the surface of the finger. In alternate embodiments, one or more pickup plates are positioned to detect the electric RF fields radiated from either side of the finger, from the bottom of the finger, or from the top of the finger. Further embodiments utilize multiple pickup plates positioned to detect the electric RF fields radiated from multiple locations on the finger. For example, multiple pickup plates may detect the electric RF fields radiated from the tip of the finger as well as two sides of the finger.

Figure 9:
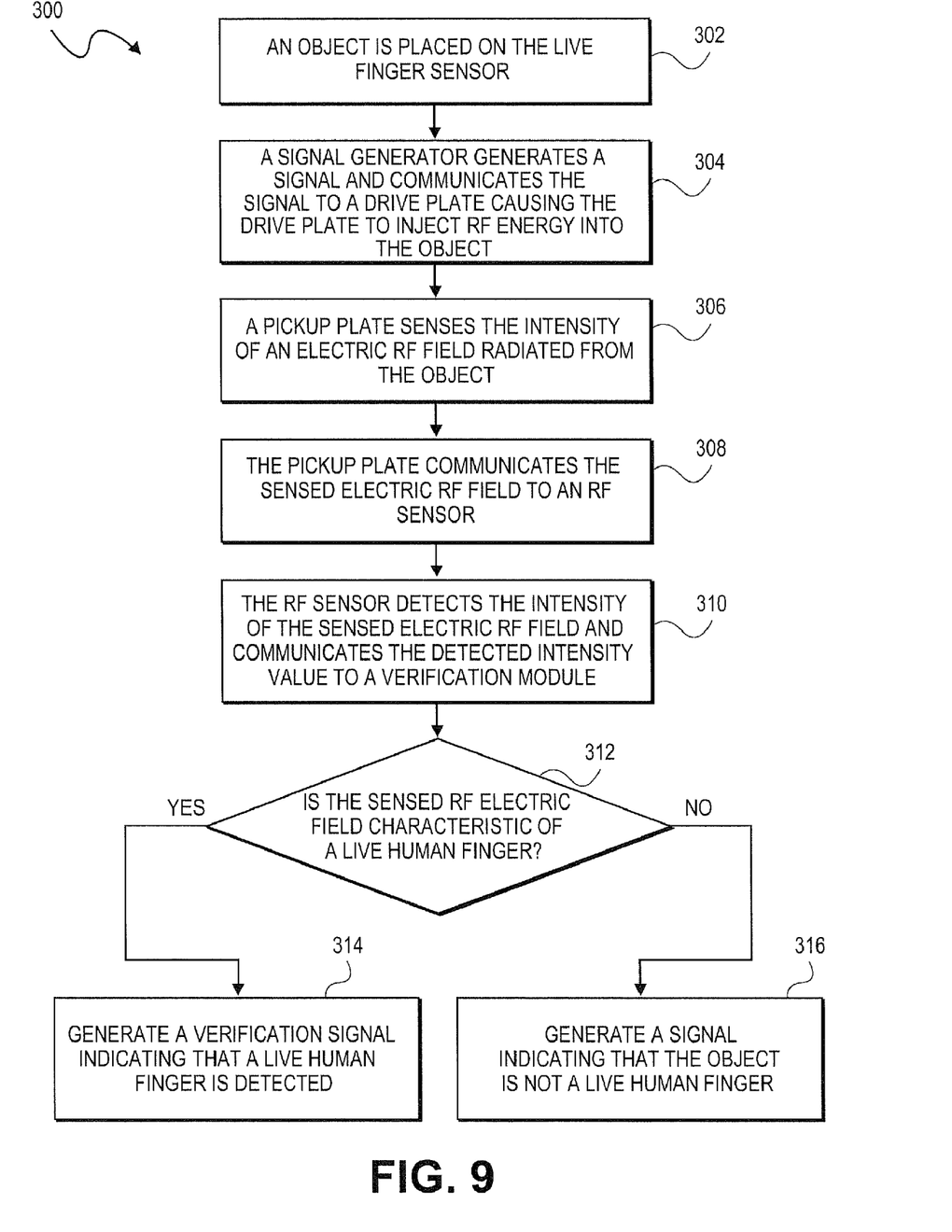
FIG. 9 depicts a flow diagram of an example method for detecting a live human finger.

FIG. 9 depicts a flow diagram of an example method 300 for detecting a live human finger. Initially, an object (such as a live finger or an artificial finger) is placed on the live finger sensor (block 302). A signal generator then generates a signal and communicates the signal to a drive plate, thereby causing the drive plate to inject RF energy into the object contacting the live finger sensor and causing electric RF fields to radiate outwardly from the surface of the object (block 304). Next, a pickup plate senses the intensity of an electric RF field radiated from the object (block 306). The pickup plate communicates the sensed electric RF field to an RF sensor (block 308). The RF sensor detects the intensity of the sensed electric RF field and communicates the detected intensity value to a verification module (block 310).

Procedure 300 continues by determining whether the sensed electric RF field is characteristic of a live human finger (block 312). If the sensed electric RF field is characteristic of a live human finger, the procedure generates a verification signal indicating that a live human finger is detected (block 314). If the sensed electric RF field is not characteristic of a live human finger, the procedure generates a signal indicating that the object is not a live human finger (block 316).

As mentioned herein, the characteristics of the electric RF fields radiated from a live finger are different from the fields radiated from an artificial finger or other type of object. Thus, a live human finger is detected and verified by analyzing the characteristics of the electric RF fields radiated from the object applied to the live finger sensor 102. Although a live finger and an artificial finger may have similar electrical impedance characteristics, the fields radiated from live fingers and artificial fingers are significantly different when using the systems and methods described herein.

For example, many materials used to manufacture artificial fingers are uniform conductors of electric fields whereas a live finger is not a uniform conductor of electric fields. Live fingers have an inherent multilayer structure that radiates electric fields based on the combined effects of both the dermal and the sub-dermal layers of the live finger tissue. This multilayer structure of live fingers is common to all fingers across large populations, demographics, dermatological conditions, and so forth. Since this multilayer structure is common to all fingers, the electric RF field characteristics of live fingers are stable over a wide range of users.

There is a significant difference in the electrical field intensity radiated from a real finger compared to that of an artificial one given the same level of excitation. This is primarily due to the multilayer nature of the skin that encloses a real finger which consists of three major layers: epidermal, dermal and subcutaneous. This layering causes an uneven distribution of electric field within the body of a real finger. Since the dermal and subcutaneous layers are more conductive, a significant portion of the field is constrained within those layers. In contrast, artificial fingers made from gelatin, rubber, glue, and other impedance mimicking materials have very uniform conductance with the electric field distributing evenly throughout the artificial finger.

Figure 10:
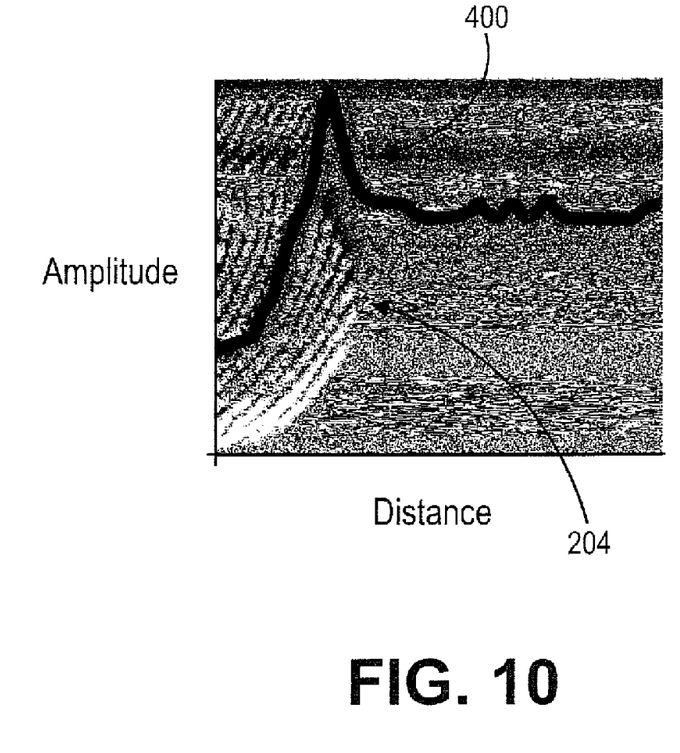
FIG. 10 depicts an example electric RF field intensity radiated from a real human finger.
Figure 11:
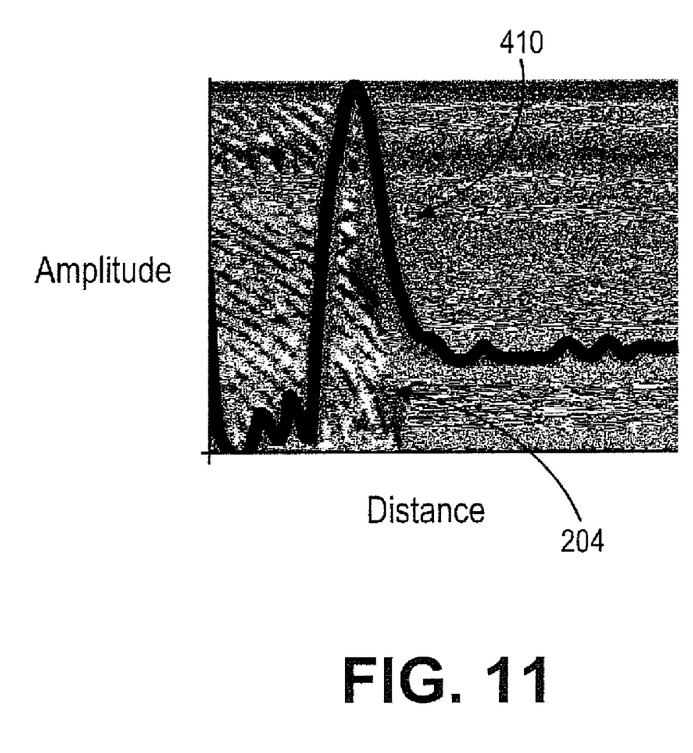
FIG. 11 depicts an example electric RF field intensity radiated from an artificial finger.

FIG. 10 depicts an example electric RF field intensity 400 radiated from a real human finger. FIG. 11 depicts an example electric RF field intensity 410 radiated from an artificial finger. As shown in FIGS. 10 and 11, the amplitude of the electric RF field intensity radiated by the artificial finger is greater than the amplitude of the electric RF field intensity radiated by the real human finger. This difference in amplitude is useful in distinguishing a real human finger from an artificial finger.

In both real human fingers and artificial fingers, the roll-off of the intensity of the radiated electric RF field follows a function defined as:

$$\text{Intensity} = \frac{A}{kD}$$

Where A is the amplitude of the electric RF field on the surface of the finger and D is the distance from the tip or edge of the finger to the pickup plate(s). The constant k is the mean decay value derived from a database of a large population of fingers. The amplitude A of an artificial finger is significantly greater than the amplitude of a real human finger. Thus, discriminating thresholds can be set for pickup plate(s) having a known distance from the tip or edge of the finger. These thresholds are set based on a large database of diverse fingers where statistical mean, median, standard deviation and similar calculations are used to set these values. As a result, this technique is effective over a wide range of demographic finger variations.

In a particular embodiment, the amplitude of the electric RF field (and other characteristics of the electric RF field) are stored in a storage device (not shown) during an enrollment process by each user. This enrollment process captures the user's fingerprint image and stores that fingerprint image data for future reference when validating the fingerprint. At the same time, this embodiment injects RF energy into the user's finger and measures the characteristics of the resulting electric RF field radiated from the finger. These characteristics of the resulting electric RF field are stored along with the fingerprint image data associated with the user, and are later used to verify that a live human finger is being applied to the live finger sensor.

Embodiments of the system and method described herein facilitate determination of whether a live human finger or an artificial finger is being applied to a sensor. Additionally, some embodiments may be used in conjunction with one or more conventional fingerprint sensing systems and methods. For example, one embodiment may be used as an improvement of existing fingerprint detection and/or sensing systems.

Although the components and modules illustrated herein are shown and described in a particular arrangement, the arrangement of components and modules may be altered to perform live finger sensing in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A detection apparatus comprising:
a plurality of drive plates configured to transmit radio frequency energy to a respective one of a plurality of drive plate contact points formed by an array of the plurality of drive plates;
a pickup plate, separated from each respective drive plate contact point by an injection gap, each respective drive plate and the pickup plate configured to transform the radio frequency energy into an electromagnetic field extending between the respective drive plate and the pickup plate extending across the respective injection gap, and the pickup plate configured to receive a modified electromagnetic field, modified by passing through an object spanning the respective injection gap; and
a sensor coupled to the pickup plate and configured to determine whether the object is a live finger based on the detected intensity of the electromagnetic field passing through the object and received at the pickup plate.

2. The detection apparatus of claim 1, wherein the object is in physical contact with the respective drive plate when the electromagnetic field passes through the object.

3. The detection apparatus of claim 1, wherein the pickup plate is positioned approximately one millimeter from the respective drive plate.

4. The detection apparatus of claim 1, wherein one side of each respective drive plate is formed with a contoured arc that substantially corresponds to the shape of a human finger tip.

5. The detection apparatus of claim 1, wherein the pickup plate is formed with a contoured arc that substantially corresponds to the shape of a human finger tip.

6. The detection apparatus of claim 1, wherein the pickup plate is positioned proximate the object without contacting the object.

7. The detection apparatus of claim 1, wherein the respective drive plate is disposed on a substrate and the pickup plate extends substantially perpendicular to the substrate.

8. The detection apparatus of claim 7, wherein the substrate is a printed circuit board.

9. The detection apparatus of claim 7, wherein the substrate is a flexible substrate.

10. The detection apparatus of claim 1, wherein the respective drive plate receives a drive signal from a signal generator, the drive signal having a frequency in the range of 10-30 MHz.

11. The detection apparatus of claim 1, wherein the respective drive plate receives a drive signal from a signal generator, the drive signal having a magnitude of approximately 2.5 volts.

12. The detection apparatus of claim 1, wherein the sensor includes a verification module configured to analyze the electromagnetic field passed through the object to determine whether characteristics of the electromagnetic field passed through the object are associated with a live finger.

13. The detection apparatus of claim 12, wherein the verification module is further configured to retrieve and compare electromagnetic field characteristics associated with a known user's fingerprint.

14. The detection apparatus of claim 1, wherein the object comprises a finger and further comprising a fingerprint sensor configured to read a fingerprint pattern associated with the finger, and wherein live finger detection and fingerprint sensing are performed at the same time.

15. A detection apparatus comprising:
a plurality of drive plates disposed on a substrate and configured to transmit radio frequency energy to a plurality of drive plate contact points formed by an array of the plurality of drive plates;
a first pickup plate disposed on the substrate separated from each respective drive plate contact point by an injection gap, each respective drive plate and the pickup plate configured to transform the radio frequency energy into an electromagnetic field extending between the respective drive plate contact point and the first pickup plate extending across the respective injection gap, and the pickup plate and configured to receive a modified electromagnetic field, modified by passing through an object spanning the respective injection gap;
a second pickup plate disposed on the substrate separated from each respective drive plate contact point by an injection gap, each respective drive plate and the pickup plate configured to transform the radio frequency energy into an electromagnetic field extending between the respective drive plate and the second pickup plate extending across the respective injection gap, and the pickup plate and configured to receive a modified electromagnetic field modified by passing through the object spanning the respective injection gap; and
a sensor coupled to the first pickup plate and the second pickup plate, the sensor configured to determine whether the object is a live finger based on the detected first and second intensities of the electromagnetic field passing through the object and received at the pickup plate.

16. The detection apparatus of claim 15, further comprising a differential receiver coupled to the first pickup plate and the second pickup plate, the differential receiver configured to determine a difference between the first intensity and the second intensity.

17. The detection apparatus of claim 15, wherein the sensor includes a verification module configured to analyze the first intensity and the second intensity to determine whether at least one characteristic of the electromagnetic field passing through the object is associated with a live finger.

18. The detection apparatus of claim 15, wherein the object comprises a finger and further comprising a fingerprint sensor configured to read a fingerprint pattern associated with the finger, wherein live finger detection and fingerprint sensing are performed at the same time.

19. An apparatus comprising:
a plurality of radio frequency energy sources configured to transmit radio frequency energy to a respective one of a plurality of drive plate contact points in an array of drive plate contact points; and
at least one pickup plate separated from each respective radio frequency energy source at each drive plate contact point by an injection gap, each respective radio frequency energy source and the respective pickup plate configured to transform the radio frequency energy into an electromagnetic field extending between the respective radio frequency energy source and pickup plate extending across the respective injection gap, and the pickup plate configured to receive a modified electromagnetic field, modified by passing through an object spanning the respective injection gap a live finger sensor proximate at least one injection gap, the live finger sensor configured to detect a characteristic associated with the electromagnetic field passing through the object and to determine whether the object is a live finger based on the at least one characteristic of the electromagnetic field passing through the object.

20. The apparatus of claim 19, wherein the radio frequency energy source is a drive plate.

21. The apparatus of claim 19, wherein the live finger sensor includes a pickup plate proximate the radio frequency energy source and an RF sensor coupled to the pickup plate.

22. The apparatus of claim 21, further comprising a verification module coupled to the RF sensor and configured to analyze the electromagnetic field passing through the object to determine whether the at least one characteristic of the electromagnetic field passing through the object is associated with a live finger.

23. The apparatus of claim 19, wherein the live finger sensor includes a first pickup plate configured to detect a first intensity associated with the electromagnetic field, and a second pickup plate configured to detect a second intensity associated with the electromagnetic field.

24. The apparatus of claim 19, wherein the object comprises a finger and further comprising a fingerprint sensor configured to read a fingerprint pattern associated with the object, wherein live finger detection and fingerprint sensing are performed at the same time.

25. A method comprising:
injecting a radio frequency signal into a plurality of drive plates configured to transmit radio frequency energy to a respective one of a plurality of drive plate contact points in an array of drive plate contact points;
detecting with a pickup plate, separated from each respective drive plate contact point by an injection gap, each respective drive plate and the pickup plate configured to transform the radio frequency energy into an electromagnetic field extending between the respective drive plate and the pickup plate across the respective injection gap, and the pickup plate configured to receive a modified-electromagnetic field, modified by passing through an object spanning the respective injection gap; and determining with a sensor coupled to the pickup plate whether the object is a live finger based on at least one characteristic of the electromagnetic field passing through the object and received at the pickup plate.

26. The method of claim 25, wherein an intensity of the electromagnetic field is detected at a predetermined distance from a surface of the object.

27. The method of claim 25, further comprising generating a signal indicating whether the object is a live finger.

28. The method of claim 25, wherein the radio frequency signal has a frequency in the range of 10-30 MHz.

29. A non-transitory machine readable medium storing instructions that, when executed by a computing device, cause the computing device to perform a method, the method comprising:

injecting a radio frequency signal into a plurality of drive plates configured to transmit radio frequency energy to a respective one of a plurality of drive plate contact points in an array of drive plate contact points;

detecting from a pickup plate, separated from each respective drive plate contact point by an injection gap, each respective drive plate and the pickup plate configured to transform the radio frequency energy into an electromagnetic field extending between the respective drive plate and the pickup plate extending across the respective injection gap, a modified electromagnetic field, modified by passing through an object spanning the respective pixel gap; and determining whether the object is a live finger based on at least one characteristic of the electromagnetic field passing through the object received from a sensor coupled to the pickup plate.

\* \* \* \* \*